United States Patent [19]

Fleck et al.

[11] Patent Number: 4,722,239
[45] Date of Patent: Feb. 2, 1988

[54] GEAR MECHANISM

[75] Inventors: Harald Fleck, Schwechat; Leopold Mader; Norbert Vollmann, both of Neudorf, all of Austria

[73] Assignee: U.S. Philips Corporation, New York, N.Y.

[21] Appl. No.: 58,641

[22] Filed: Jun. 3, 1987

Related U.S. Application Data

[63] Continuation of Ser. No. 757,580, Jul. 22, 1985.

[30] Foreign Application Priority Data

Aug. 1, 1984 [AT] Austria ................... 2482/84

[51] Int. Cl.$^4$ ............................................. F16H 55/17
[52] U.S. Cl. ....................................................... 74/435
[58] Field of Search ........................... 74/435, 436, 437

[56] References Cited

U.S. PATENT DOCUMENTS

| | | | |
|---|---|---|---|
| 1,758,206 | 5/1930 | Van Ryan et al. | 74/435 |
| 2,797,589 | 7/1957 | Chaveneaud | 74/435 |
| 2,881,630 | 4/1959 | Opocensky | 74/435 |
| 3,768,325 | 10/1973 | Kucharski | 74/435 |
| 3,813,952 | 6/1974 | Fehrenbacher | 74/435 |
| 4,023,813 | 5/1977 | Dennis | 74/435 |

FOREIGN PATENT DOCUMENTS

| | | | |
|---|---|---|---|
| 143943 | 9/1903 | Fed. Rep. of Germany . | |
| 277829 | 9/1914 | Fed. Rep. of Germany | 74/435 |
| 348517 | 2/1922 | Fed. Rep. of Germany . | |
| 707242 | 6/1941 | Fed. Rep. of Germany | 74/435 |

Primary Examiner—Lawrence Staab
Attorney, Agent, or Firm—Robert T. Mayer

[57] ABSTRACT

A gear mechanism (1) is selectively reversible between two end positions and which comprises a driving gear member (3), which can alternately be driven in opposite driving directions (19, 20) and a driving member (5) which can be driven by said driving gear member, one gear member (3) being partly toothed to form a toothed portion (8) which is bounded by two end faces (6, 7). The gear members can be brought into and out of mesh with each other. For bringing the two gear members (3, 5) into mesh with each other in at least one driving direction (19, 20) of the relevant gear member (3) said members carry a pair of actuating stops (34, 35, 43, 44) which correspond to the relevant driving direction, which are axially offset relative to the teeth (8, 9), and which each comprise a stop surface (36, 37, 45, 46) whose geometry is in conformity with that of a tooth-flank surface (38, 39, 47, 48). At least one (35, 44) of the pairwise cooperating actuating stops (34, 35, 43, 44) extends beyond the addendum circle of the toothed portion (9) of the gear member (5) carrying this actuating stop (35, 44), its stop surface (37, 46) being prolonged in conformity with the tooth-flank geometry. The actuating stops (34, 35, 43, 44) cooperate pairwise via their stop surfaces (36, 37, 45, 46) to bring the gear members (3, 5) into mesh with each other.

5 Claims, 8 Drawing Figures

GEAR MECHANISM

This is a continuation of application Ser. No. 757,580, filed July 22, 1985.

The invention relates to a gear mechanism comprising a driving gear member which can be driven in at least one driving direction and a gear member which can be driven by said driving gear member. One gear member is partly toothed in such a way that its toothed portion is bounded by two end faces. This toothed portion can be brought into and out of mesh with the teeth of the other gear member by at least one end face of said toothed portion in order to bring the two gear members into mesh and out of mesh when the driving gear member is driven. The teeth of one of the gear members projects into the path of movement of the teeth of the other gear member when said gear members are out of mesh. At least n teeth of the partly toothed gear member are in mesh with the teeth of the other gear member when the gear members are in mesh, n being an integer greater than zero. The gear members, in order to be meshed with each other in at least one driving direction of the driving gear member, carry a pair of axially offset actuating stops. These stops correspond to the relevant driving direction and cooperate pairwise with each other by means of their stop surfaces when the two gear members are starting to mesh with each other. Each stop surface of an actuating stop having the same geometry as the first-engaging tooth-flank surface of the first-meshing tooth of the gear member carrying that stop. Each stop surface, viewed along the relevant pitch circle in the direction in which the gear member carrying this actuating stop is driven when the gear members are meshed, is situated before the first-engaging tooth-flank surface of the first-meshing tooth of this gear member. It is situated along that pitch circle at a distance from the forementioned first-engaging tooth-flank surface which corresponds to k times the circular pitch, k being an integer between zero and n−1.

Such a gear mechanism is known, for example form DE-PS No. 143 943. This known mechanism is non-reversible and comprises two gear members in the form of gear wheels, of which both the driving gear wheel and the drivable gear always rotate in the same direction. The driving gear wheel, which has teeth over its entire circumference, rotates continuously and the drivable gear wheel, which is partly toothed, rotates periodically. In order to mesh the two gear wheels when the driving gear wheel of the known mechanism is driven, the drivable gear wheel must be actuated by means of a separate device, after which the actuating stops cooperate with each other via their stop surfaces to provide a correct intermeshing of the two gear wheels. However, such a separate device renders the mechanism more intricate and more expensive.

It is the object of the invention to construct a gear mechanism of the type specified in the opening paragraph in such a way that it can be reversed simply and when the driving gear member is driven the two gear members can be meshed with each other without additional actuation of the drivable gear member. To this end the invention is characterized in that in order to obtain a gear mechanism which is selectively reversible between two end positions, the driving gear member can be driven alternately in two opposite driving direction. The stop surface of the actuating stop on the driving gear member has the same geometry as the leading tooth-flank surface of the first-meshing tooth of the driving gear member in the driving direction of said driving gear member when the gear members are meshed with each other. The stop surface of the actuating stop on the drivable gear member has the same geometry as the trailing tooth-flank surface of the first-meshing tooth of the drivable gear member in the drving direction of said drivable gear member when the gear members are meshed with each other. At least one of the two pairwise cooperating actuating stops is extended beyond the addendum circle of the teeth of the gear member carrying said actuating stop in such a way that its stop surface is extended in conformity with the tooth-flank geometry. The stop surface of the actuating stop on the drivable gear member is situated in the path of movement of the stop surface of the actuating stop on the driving gear member when the gear members are not in mesh and the driving gear member moves its actuating stop towards the actuating stop on the drivable gear member in order to mesh the two gear members with each other. Thus, a selectively reversible gear mechanism is obtained in a simple manner. In addition when the driving gear member is driven the stop surface of the actuating stop on said member butts against the stop surface of the actuating stop on the drivable gear member and thereby actuates this gear member, so that the teeth of the two gear members mesh with each other in a particularly simple manner. Since the stop surfaces are constructed in conformity with each of the tooth-flank surfaces this ensures that the two gear members mesh with each other without any problems as would occur for example if two teeth which should mesh with each other abut with their crest surfaces. Directly before the teeth cooperate with each other the drivable gear member is driven by the actuating stops with practically the same angular velocity with which they are subsequently driven by the teeth. This results in a smooth actuation for the drivable gear member and any further parts to be driven thereby when the gear members are meshed with each other. The two gear members may both be constructed as gear wheels, but alternatively one of them may be constructed as a gear rack, which may be regarded as a gear wheel of infinite diameter in gear-mechanism technology.

It is to be noted that from DE-PS No. 348,517 a reversible gear mechanism comprising five gear wheels is known, in which reversing if effected at periodic intervals defined by the construction of the mechanism. Selection reversal is not possible in contradistinction to the mechanism in accordance with the present invention. In the mechanism described in DE-PS No. 348,517 one gear wheel is provided with a tooth-like projection beyond the pitch circle of its teeth. It engages a recess which resembles a tooth gap and extends below the dedendum circle of a further gear wheel to bring this wheel into mesh with the first-mentioned gear wheel. However, this projection has an entirely different shape than the teeth of this gear wheel and consequently the recess in the further gear wheel has completely different shape than the tooth gaps of said further gear wheel. As a result the surfaces of the projection and of the recess which cooperate with each other when the two gear wheels are meshed are not in conformity with the tooth-flank surfaces of the teeth, so that the two gear wheels in this known gear mechanism can only cooperate correctly with each other if the projection and the corresponding recess accurately match the position and shape of the teeth of the gear wheels. This demands a high precission during the manufacture of the mechanism and consequently leads to a substantial rise in cost. However, in the mechanism in accordance with the invention the stop surfaces of the actuating stops simply are constructed in confirmity with the tooth-flank surfaces. As a result the requirements imposed on the precision with which the mechanism is manufactured need not to be very stringent. Since in the known mechanism the contact surfaces are not constructed in conformity with the tooth-flank surfaces, the drivable gear wheel is given another angular velocity by the actuating stop different than by the teeth. This difference in velocity gives rise to an annoying irregularity in the motion of the drivable gear wheel when the gear wheels are meshed with each other, which is not the case in the mechanism in accordance with the invention.

In the mechanism in accordance with the invention the stop surface of the actuating stop on the drivable gear member is situated in the path of movements of the stop surface of the actuating stop on the driving gear member when the gear members are not in mesh. After disengagement of the teeth the two gear members are brought out of mesh automatically because the drivable drive member is no longer driven and because of the friction to which this gear member is subjected. However, it is alternatively possible to provide a disengageable latching device or a braking device for the drivable gear member, which device when the gear members are not in mesh retains the drivable gear member in a position in which the stop surface of the actuating stop on this member is situated in the path of movement of the stop surface of the actuating stop on the driving gear member. In this respect it is found to be advantageous if there is provided a stationary limiting stop, which when the gear members are not in mesh is situated opposite a counterstop on the drivable gear member to block movement of the drivable gear member in the driving direction when the gear members are brought out of mesh. This ensures in a very simple manner that after the teeth of the two gear members have become disengaged when they are brought out of mesh the drivable gear member cannot be moved too far, thereby guaranteeing that the stop surface of the actuating stop on the drivable gear member is always situated in the path of movement of the stop surface of the actuating stop on the driving gear member, so that the two gear members can again be meshed with each other without any problems.

In this respect it is also found to be advantageous that when the gear members are not in mesh the counter-stop on the drivable gear member is urged against the stationary limiting stop under the influence of a spring. Thus, when the gear members are not in mesh the counter-stop on the drivable gear member is urged against the stationary limiting stop without clearance and is thus accurately retained in its position, so that further parts which are coupled to the drivable gear member and which can be moved thereby are also accurately positioned. In addition, this ensures that the teeth of the gear members remain out of mesh once they have been disengaged from one another.

In this respect it is also found to be advantageous that the driving gear member comprises a further limiting stop which is situated opposite a further counter-stop on the drivable gear member when the gear members are not in mesh to block a movement of the drivable gear member in the driving direction as obtained when the gear members are meshed with each other. As a result of this, the counter-stop and the further counter-stop on the drivable gear member are retained between the stationary limiting stop and the limiting stop on the driving gear member when the two gear members are not in mesh, so that no external forces act on these members, which is advantageous for a correct and smooth operation of the mechanism. The cooperation of the further counter-stop on the drivable gear member with the further limiting stop on the driving gear member also ensures that the teeth on the gear members remain out of mesh with these members have been disengaged.

The further limiting stop of the driving gear member may comprise, for example, a projection on a non-toothed portion of the driving gear member, which projection cooperates with a further counter-stop in the form of a tooth of the drivable gear member, and which is situated opposite said further counter-stop when the gear members are not in mesh. It is found to be very advantageous if the further counter-stop is constituted by a prolonged actuating stop on the drivable gear member. In this way the actuating stop on the drivable gear member is not only used for bringing the gear members in mesh with each other but also for defining the position of the drivable gear member when the gear members are not in mesh, so that the stops used for defining this position do not affect the construction of the teeth.

Figure 1:
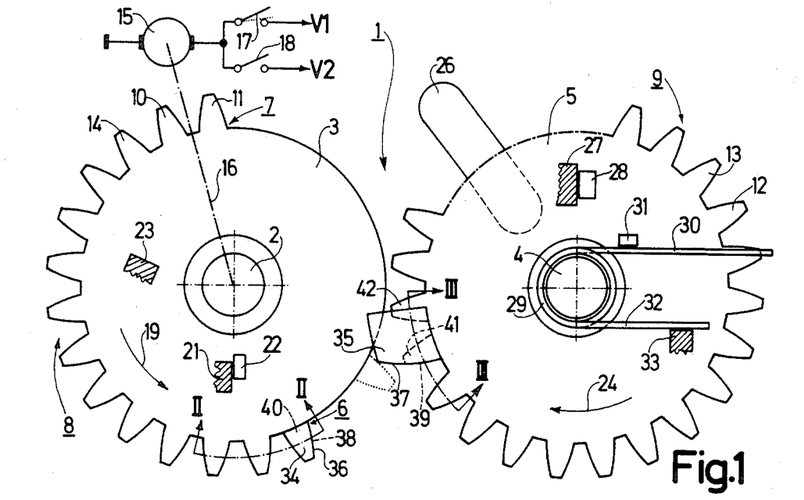
FIG. 1 is a plan view of a first embodiment of the gear mechanism in one end position.
Figure 2:
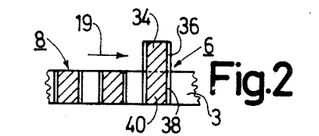
FIG. 2 is a sectional view taken on line II—II of FIG. 1.
Figure 3:
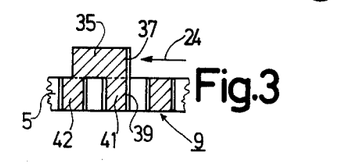
FIG. 3 is a sectional view taken on line III—III of FIG. 1.
Figure 4:
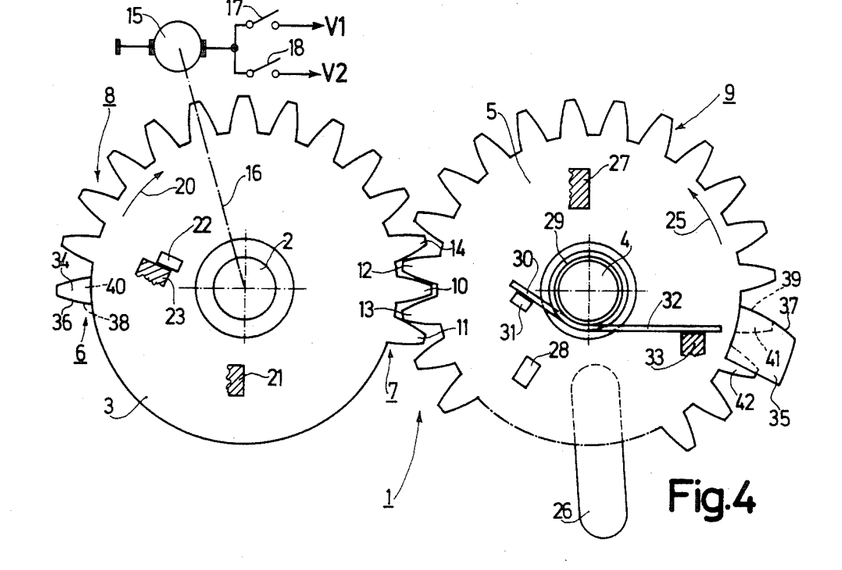
FIG. 4 shows the gear mechanism of FIG. 1 in the other end position.
Figure 5:
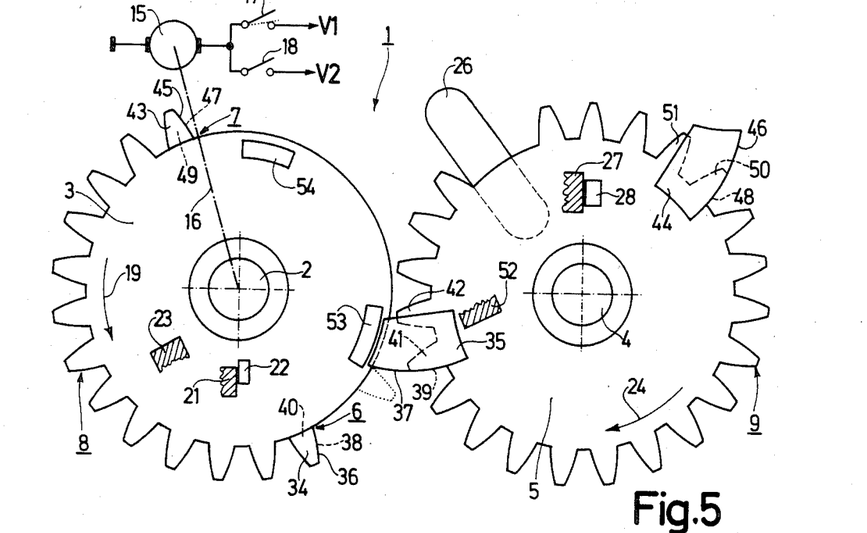
FIG. 5 is a plan view of a second embodiment of the gear mechanism in one end position.
Figure 6:
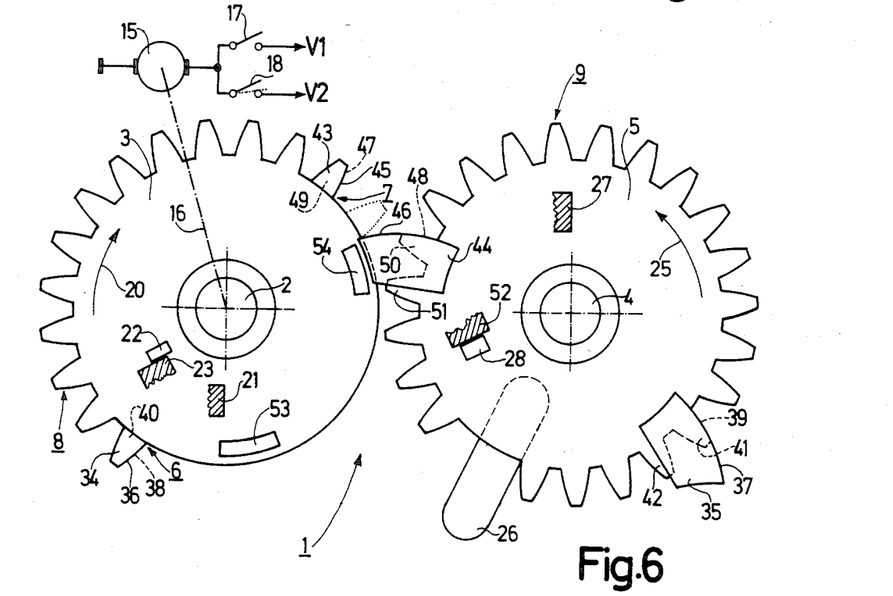
FIG. 6 shows the gear mechanism of FIG. 5 in the other end position.
Figures 7, 8:
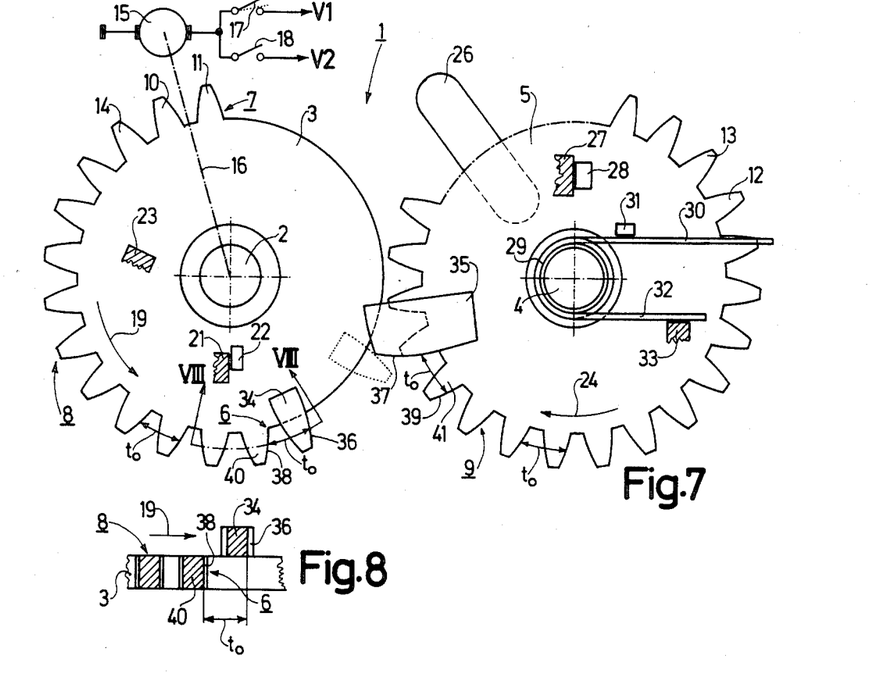
FIG. 7 is a plan view of a third embodiment of the gear mechanism.
FIG. 8 is a sectional view taken on line VIII—VIII of FIG. 7.

Three embodiments of the invention will now be described in more detail, by way of example, with reference to the accompanying drawings. FIG. 1 is a schematic plan view of a gear mechanism, in accordance with a first embodiment. Then mechanism is selectively reversible between two end positions in which two gear wheels comprise a pair of actuating stops for bringing the wheels into mesh with each other in one driving direction of the driving gear wheel. The two gear wheels are shown in one of their two positions with their teeth out of mesh with each other. FIG. 2 shows a part of the mechanism comprising the actuating stop on the driving gear wheel in a sectional view taken on the arc II—II in FIG. 1. The arc corresponds to an arc of the pitch circle of the driving gear wheel. FIG. 3 shows a part of the mechanism comprising the actuating stop on the drivable gear wheel in a sectional view taken on the arc III—III in FIG. 1. The arc corresponds to an arc of the pitch circle of the drivable gear wheel. FIG. 4 shows the gear mechanism of FIG. 1 with the two gear wheels in the other end positions with their teeth in mesh with each other. FIG. 5, like FIG. 1, shows a selectively reversible gear mechanism in accordance with a second embodiment, in which two gear wheels comprise two pairs of actuating stops for bringing said wheels in mesh with each other in both driving directions of the driving gear wheel. The two gear wheels being shown in one of their two end positions with their teeth not in mesh. FIG. 6 shows the gear mechanism of FIG. 5, the two gear wheels being shown in the other end position with their teeth out of mesh after they have meshed during changeover of the gear wheels. FIG. 7 shows a selectively reversible gear mechansim in accordance with a third embodiment, in which two gear wheels comprise a pair of actuating stops for meshing said wheels in one driving direction of the driving gear wheel. The actuating stop on the partly toothed driving gear wheel is situated before the toothed portion of the driving gear wheel viewed in the direction in which the driving gear wheel must be driven to bring the two gear wheels into mesh. FIG. 8 shows a part of the gear mechanism of FIG. 7 with the actuating stop on the driving gear wheel in a sectional view similar to FIG. 2.

FIGS. 1 to 4 show a gear mechanism 1 which is selectively reversible between two end positions, FIG. 1 showing the mechanism in one of its end positions and FIG. 4 showing the mechanism in its other end position. The gear mechanism 1 comprises a driving gear member in the form of a gear wheel 3, which is rotatably journalled on a shaft 2, and a drivable gear member in the form of a gear wheel 5, which is rotatably journalled on a shaft 4. The driving gear wheel 3 is necessarily toothed partly, its toothed portion 8 being bounded by two end faces 6 and 7. The drivable gear wheel has teeth 9, shown partly, over the entire circumference of the gear wheel 5, but not all these teeth can mesh with the teeth 8 on the driving gear wheel 3. Therefore, the gear wheel 5 may alternatively comprise a non-toothed portion as indicated by the dashed-dot line, so that the drivable gear wheel also has a toothed portion which is bounded by two end faces. The fact that one of the two gear wheels is necessarily toothed partly means that the two gear wheels can be brought into and out of mesh with each other. In order to bring the two gear wheels 3 and 5 in the present example into and out of mesh with each other the teeth 8 can be brought into and out of mesh with the teeth 9 on the drivable gear wheel 5 by the end face 6 by driving the driving gear wheel 3. When the gear wheels 3 and 5 are not in mesh the teeth 9 of the gear wheel 5 project into the path of movement of the teeth 8 on the gear wheel 3, as is shown in FIG. 1. When the teeth 8, 9 mesh with each other at least n teeth (n=2 in the present case) of the tooted portion 8 on the gear wheel 3 mesh with the teeth 9 on the other gear wheel 5, as is shown in FIG. 4, the meshing teeth bearing the reference numerals 10, 11, 12 and 13. It is to be noted that the tooth 14 of the gear wheel 3 is no longer in mesh with a tooth 9 of the gear wheel 5 in the situation shown in FIG. 4. For the sake of simplicity the toothed portions 8 and 9 are shown schematically, the teeth being involute teeth so that the tooth-flank surfaces also have an involute geometry.

Via a transmission 16, represented schematically in dash-dot lines, the driving gear wheel 3 can be driven by a motor 15 in two opposite directions between its two end positions, which transmission may comprise a bidirectional overload coupling, for example a torsion-spring coupling, arranged at the motor side and self-braking mechanism, for example a worm gear, arranged at the gear-wheel side. A supply voltage V1 can be applied to the motor 15 by first switch 17 and a supply voltage V2 can be applied to the motor via a second switch 18. When the first switch 17 is closed the motor 15 runs in such a direction of rotation that it drives the driving gear wheel 3 in the driving direction indicated by the arrow 19 the transmission 16, in which direction the gear wheels 3 and 5 can be made to mesh witt their teeth 8 and 9. When the second switch 18 is closed the motor 15 rotates in the opposite direction, so that it drives the gear weel 3 in the opposite driving direction the transmission 16, in which direction the teeth of the two gear wheels 3 and 5 can be disengaged.

As already stated, the driving gear wheel 3 can be rotated between two end positions, namely a rest position shown in FIG. 1 and an operating position shown in FIG. 4, in which the gear wheel 3 is retained by the self-braking mechanism after the motor 15 is stopped by opening the switch 17 or 18. The rest position of the driving gear wheel is defined by a first stationary limiting stop 21, which abuts with an axially offset counter-stop 22 on the driving gear wheel 3 when this wheel is in its rest position, as shown in FIG. 1. the operating position of the gear wheel 3 is defined by a second stationary limiting stop 23, which abuts with the counter-stop 22 when the gear wheel 3 is in its operating position, as is shown in FIG. 4.

As stated in the foregoing, the drivable gear wheel 5 can also be rotated between two end positions, namely a rest position shown in FIG. 1 and an operating position shown in FIG. 4. When the driving gear wheel 3 is driven in the direction 19 the two gear wheels, as will be described in more detail hereinafter, mesh with each other and the drivable gear wheel 5 is rotated in the direction indicated by the arrow 24 from its rest position into its operating position. When the driving gear wheel 3 is rotated in the opposite direction 20 the drivable gear wheel is driven in the opposite direction indicated by the arrow 25, causing the drivable gear wheel 5 to be rotated from its operating position into its rest position and causing the two gear wheels to become disengaged. An arm 26 is coupled to the drivable gear wheel 5 and may, for example, be pivotally connected to an intermediate lever in order to transmit the movement to further parts. The rest position of the drivable gear wheel 5 is defined by a further stationary limiting stop 27, which when the gear wheels 3 and 5 are not in mesh is situated opposite an axially offset counter-stop 28 on the drivable gear wheel 5 and thereby blocks a movement of the drivable gear wheel 5 in the driving direction 2 as obtained during disengagement of the gear wheels. In the rest position of the drivable gear wheel 5, i.e. when the gear wheels are not in mesh, the counter-stop 28 on the drivable gear wheel 5 is urged against the stationary limiting stop 27 by means of a spring 29. The spring 29 fitted on the shaft 4 is a multi-turn wire spring comprising a limb 30, which is situated nearer the drivable gear wheel 5 in the axial direction and acts on a projection 31 on the drivable gear wheel 5, and another limb 32, which is more remote from the drivable gear wheel and acts on a further stationary stop 33. The operating position of the drivable gear wheel 5 is defined by the gear wheel 3, which is retained in its operating position, by the meshing teeth 10, 11 and 12, 13 of the toothed portions 8 and 9.

In order to mesh the two gear wheels 3 and 5 with each other in the driving direction 19 of the driving gear wheel 3, these gear wheels carry actuating stops 34 and 35 which corresponds to this driving direction and which are axially offset relative to the teeth 8 and 9.

When the two gear wheels 3 and 5 are meshed with each other the actuating stops 34 and 35 cooperate pairwise by their stop surfaces 36 and 37. Each of stop surfaces 36 and 37 of the actuating stops 34 and 35 respectively has the same geometry, i.e. an involute geometry, as the first-engaging tooth-flank surface 38 and 39 of the first-meshing tooth 40 or 41 on the respective gear wheel 3 or 5 when these wheels are meshed with each other. Each stop surface 36 or 37 is axially aligned with the first-meshing tooth-flank surface 38 or 39. The stop surface 36 of the actuating stop 34 on the driving gear wheel has the same geometry as the leading tooth-flank surface 38 of the first-meshing tooth 40 of the gear wheel 3 in the driving direction of the driving gear wheel 3 when the gear wheels are meshed. The stop surface 37 or the actuating stop 35 on the drivable gear wheel 5 has the same geometry as the trailing tooth-flank surface 39 of the first-meshing tooth 41 of the gear wheel 5 in the driving direction 24 of the drivable gear wheel 5 when the gear wheels are meshed with each other. Of the two pairwise cooperating actuating stops 34 and 35 the actuating stop 35 on the gear wheel 5 extends beyond the addendum circle of the teeth 9 of the gear wheel 5 carrying the actuatig stop 35. Its stop surface 37 is extended in conformity with the tooth-flank geometry, i.e. in conformity with the shape of the involute tooth-flank surface 39.

The actuating stop 34 comprises a projection which is integral with the gear wheel 3 and which is axially aligned with the tooth 40. The actuating stop 35 comprises a projection which is integral with the teeth 41 and 42 of the gear wheel 5 and bridges the gap between the tooth 41 and the adjacent tooth 42. When the gear wheels 3 and 5 are not in mesh the stop surface 37 of the actuating stop 35 on the drivable gear wheel 5 extends in the path of movement of the stop surface 36 of the actuating stop 34 on the driving gear wheel 3. In order to mesh the two gear wheels 3 and 5 with each other the driving gear wheel rotates its actuating stop 34 towards the actuating stop 35 on the drivable gear wheel 5.

The operation of the gear mechanism shown in FIGS. 1 to 4 will now be described, assuming that the gear mechanism 1 is in the first end position in which the two gear wheels 3 and 5 occupy the rest position shown in FIG. 1. If in this situation the switch 18 is closed inadvertently the motor 15 will be started but the driving gear wheel cannot be rotated in a direction opposite to the direction 19, because the stationary limiting stop 21 blocks a movement of the stop 22 on the driving gear wheel 3. The overload coupling on the transmission 16 ensures that no force is transmitted from the motor 15 to the driving gear wheel 3. However, if the switch 17 is closed, the motor 15 rotates driving gear wheel 3 in the direction 19 by the transmission 16, so that the gear wheel 3 leaves its rest position shown in FIG. 1. During this rotation of the driving gear wheel 3 the actuating stop 34 occupies the position shown dotted in FIG. 1, in which the stop surface 36 of the actuating stop 34 cooperates with the stop surface 37 of the actuating stop 35. As the gear wheel 3 is rotated further the actuating stop 34 drives the actuating stop 35, so that the drivable gear wheel 5 is also rotated and the two involute stop surfaces 36 and 37, which are in line with the first-engaging tooth-flank surfaces 38 and 39 respectively of the first-meshing teeth 40 and 41 respectively, cooperate with each other and, in principle, mesh with each other. As a result of their involute shape the stop surfaces 36 and 37 provide a constant transmission during meshing and ensure that the two toothed portions 8 and 9, even before the first-meshing teeth 40 and 41 contact each other, are aligned in such a relative position that the tooth-flank surfaces 38 and 39 which are situated in line with the stop surfaces 36 and 37 respectively come into contact with each other without problems, thereby guaranteeing an undisturbed smooth cooperation of the two toothed portions 8 and 9. When the driving gear wheel 3 is driven this meshing is effected fully automatically as a result of the cooperating actuating stops 34 and 35. After the toothed portions 8 and 9 of the two gear wheels 3 and 5 have been brought into mesh, the drivable gear wheel 5 is driven by the driving gear wheels by the toothed portions 8 and 9 against the force of the spring 29. As soon as the driving gear wheel has reached its operating position, in which the counter-stop 22 on the gear wheel 3 butts against the stationary limiting stop 23, the transmission of power to the driving gear wheel 3 by the motor 15 is interrupted by the overload coupling in the transmission 16 and the driving gear wheel 3 is retained in its operating position by the self-braking mechanism. As a result the drivable gear wheel 5 is also maintained in its operating position by the meshing toothed portions 8 and 9. The gear mechansim 1 is then in its second end position and the switch 17 may be opened.

In order to return the gear mechanism 1 from the second end position shown in FIG. 4 to its first end position, the switch 18 should be closed. An inadvertent closure of the switch 17 has no effect in this situation because the counter-stop 22 on the gear wheel 3, which abuts with the limiting stop 23, blocks a rotation of this gear wheel 3 in a direction opposite to the driving direction 20 and the overload coupling in the transmission 16 interrupts the transmission of power to the driving gear wheel 3. When the switch 19 is closed the motor 15 drives the gear wheel 3 in the driving direction 20 by the transmisison 16, so that the gear wheel 3 leaves its operating position shown in FIG. 4. By the meshing toothed portions 8 and 9 the drivable gear wheel 5 is then driven, the rotation of the gear wheel 5 being sustained by the spring 29. As soon as the two toothed portions 8 and 9 have become disengaged, the spring 29 ensures that the gear wheel 5 is returned to its rest position, in which the counter-stop 28 of the gear wheel 5 abuts against the stationary limiting stop 27 and in which the stop surface 37 of the actuating stop 35 on the drivable gear wheel 5 is situated in the path of the movement of the stop surface 36 of the actuating stop 34 on the driving gear wheel 3. As soon as the driving gear wheel 3 has reached its rest position, the overload coupling in the transmission 16 interrupts the transmission of power from the motor 15 to the gear wheel 3 and the self-braking mechanism retains the gear wheel 3 in its rest position. The gear mechanism 1 is then again in its first end position and the switch 18 may be opened again.

As will be apparent from the foregoing description, the inventive steps very simply provide a gear mechanism which is selectively reversible between the two end positions and whose two gear wheels can be made to mesh automatically with each other owing to the presence of the two actuating stops. The involute shape of the stop surfaces of the actuating stops ensure a smooth undisturbed and precise meshing of the teeth. When the gear wheels are not in mesh the position of the drivable gear wheel is defined very simply by a stationaly stop, against which this gear wheel is urged by spring force. This ensures that after the disengagement of the teeth the drivable gear wheel cannot be moved too far, so that the stop surface of the actuating stop on the drivable gear wheel remains in the path of movement of the stop surface of the actuating stop on the driving gear wheel, which is important for bringing the teeth into mesh again. The spring which acts on the drivable gear wheel ensures that the actuating stop on this wheel is urged against the limiting stop without backlash when the gear wheels are not in mesh, so that the parts which are coupled to the drivable gear wheel by the arm and which can be driven by said wheel are retained in accurately defined positions.

Such a gear mechanism which is selectively reversible between two end positions may be used very advantageously in, for example, a magnetic video-tape apparatus for a magnetic tape contained in a cassette, which tape can be extracted from the cassette and wrapped around a tape guide drum by means of a threading mechanism which is movable between two positions. The drivable gear wheel of the gear mechanism provides a smooth movement of the threading mechanism between its two positions by a lever mechanism, which is important to ensure that the magnetic tape is treated gently. Obviously, this is merely a non-limitative example of the use of such a gear mechanism.

The embodiment of a selectively reversible gear mechanism described with reference to FIGS. 1 to 4 may be modified in several ways within the scope of the invention. For example, the actuating stops may be interchanged, i.e. the prolonged actuating stop may be arranged on the driving gear wheel and the other actuating-stop on the drivable gear wheel. However, alternatively each of the two gear wheels may comprise an actuating stop which extends beyond the addendum circle of the relevant gear wheel. Further, the drivable gear member may be a gear rack, which is then reciprocated by the driving gear wheel. Moreover, the driving gear member may be constructed as a gear rack, which can then be reciprocated to drive the driving gear wheel. It is obvious that only one gear wheel may have external teeth and the other gear wheel with which it can cooperate may be provided with inner teeth. Further, the driving gear wheel may be toothed over its entire circumference, in which case the drivable gear wheel must be partly toothed to form a toothed portion which is bounded by two end faces, one end face being defined by that tooth whose tooth flank is situated in line with the stop surface of the actuating stop. The non-toothed portion extends from this tooth in the same direction as that in which the drivable gear wheel is driven when the gear wheels are meshed with each other. It is obvious that instead of involute teeth it is possible to use teeth having other tooth-flank geometries, for example cycloid teeth, in which case the stop surface of a prolonged actuating stop is prolonged in conformity with the cycloid shape of the tooth-flank surfaces. The transmission between the motor and the driving gear wheel may be of another construction and, for example, need not comprise an overload coupling. In that case the driving gear wheel can actuate a switch when one of its end positions is reached to disconnect the motor from the relevant power supply. Alternatively, the drivable gear wheel need not transmit its motion by an arm arranged on the gear wheel but it may mesh with a further gear wheel. The spring which maintains the drivable gear wheel in its rest position need not act directly on this gear wheel but may alternatively act on an arm which projects from the gear wheel or on a further part which can be driven by the arm. Instead of the spring a separate controllable latching device may be provided which moves and keeps the drivable gear wheel against a stationary limiting stop after the gear wheels have become disengaged.

The gear mechanism 1 shown in FIGS. 5 and 6, which is selectively reversible between two end positions differs from the gear mechanism described with reference to FIGS. 1 to 4 in that in the two end positions of the gear mechanism the two gear wheels 3 and 5 are not in mesh and can mesh with each other in both driving directions 19 and 20 of the driving gear wheel, starting from each of the end positions. For this purpose the two gear wheels 3 and 4 comprise two pairs of actuating stop 34, 35 and 43, 44 which are axially offset relative to the teeth 8 and 9. The pair of actuating stops 34 and 35 correspond to the driving direction 19 and the pair of actuating stop 43 and 44 correspond to the driving directoin 20 of the driving gear wheel 3. When the two gear wheels 3 and 5 are meshed with each other in the driving direction 20 of the driving gear wheel the actuating stops 43 and 44 cooperate pairwise by their stop surface 45 and 46. Each of the stop surfaces 45 and 46 of the actuating stops 44 and 43 respectively have the same geometry, that is, an involute shape, as the first engaging tooth-flank surfaces 47 and 48 respectively of the first-meshing teeth 49 and 50 respectively of the gear wheels 3 and 5 respectively. Each of the surfaces 45 and 46 is axially aligned with the first-engaging tooth-flank surfaces 47 and 48 respectively. The stop surface 45 of the actuating stop 43 on the driving gear wheel 3 has the same geometry as the leading tooth-flank surface 47 of the first-meshing tooth 49 of the gear wheel 3 in the driving direction 20 of the driving gear wheel 3. The stop surface 46 of the actuating stop 44 on the drivable gear wheel 5 has the same geometry as the trailing tooth-flank surface 48 of the first-meshing tooth 50 of the gear wheel 5 in the driving direction 25 of the drivable gear wheel 5. Of the two pairwise cooperating actuating stops 43 and 44 the actuating stop 44 on the drivable gear wheel 5 again extends beyond the addendum circle of the teeth 9 on this gear wheel 5. In addition its stop surface 46 is prolonged in conformity with the tooth-flank geometry, namely, in conformity with the involute shape of the tooth-flank surface 48.

The actuating stop 43 comprises a projection which is integral with the gear wheel 3 and which axially adjoins the tooth 49. The actuating stop 44 comprises an axially offset projection which is integral with and bridges the tooth gap between the tooth 50 and the adjacent tooth 51 on the gear wheel 5. The actuating stop 35 has the same shape as the actuating stop 44, a high stability being obtained as a result of the integration of the two actuating stops 35 and 44 with the body of the gear wheel 5.

In comparison with the gear mechanism described with reference to FIGS. 1 to 4, the end positions of the drivable gear wheel 5 in the present gear mechanism are defined in a different manner. In order to limit the rotation of the drivable gear wheel 5 the counter-stop 28 cooperates with the stationary limiting stop 27 and with a further stationary limiting stop 52. The presence of these stationary limiting stops 27 and 52 ensures that each of the actuating stops 35 and 44 of the drivable gear wheel 5 extends with its stop surface 37 or 46 in the path of movement of the stop surface 36 or 45 of the actuating stops 34 and 43 respectively on the driving gear wheel 3 with which it cooperates pairwise. In order to define the end position of the drivable gear wheel 5 the driving gear wheel comprises two further limiting stops 53 and 54, which are axially offset from the driving gear wheel 3. When the gear wheels mesh with each other and are in an end position, one of said further limiting stops 53 and 54 on the driving gear wheel 3 is situated opposite a further counter-stop on the drivable gear wheel 5. Each further counter-stop is simply constituted by a prolonged actuating stop 35 or 44, the shape of the further limiting stops 53 and 54 being adapted to the free ends of the prolonged actuating stops 35 and 44 with which to cooperate. In this way the further limiting stops 53 and 54 block a movement of the drivable gear wheel 5 in the respective driving directions 24 and 25 as obtained during meshing of the gear wheels. In this way the end position of the drivable gear wheel 5 is defined by its counter-stop 28 and one of its two actuating stops 35 and 44 between a stationary limiting stop 27 or 52 and a further limiting stop 53 and 54 on the driving gear wheel 3. As a result, no external forces, such as these exerted by a spring, act on the drivable gear wheel, which is advantageous for undisturbed and smooth operation of the gear mechanism. As in both end positions the drivable gear wheel 5 is not in mesh with the driving gear wheel, the end positions of the drivable gear wheel can be selected independently of the two end-positions of the driving gear wheel in a comparatively wide range.

When the driving gear wheel 3 is driven out of its end positions the further limiting stops 53, 54 on this gear wheel are moved along, so that they are moved away from the prolonged actuating stops 35, 44, thus liberating these stops. Thus, if subsequently one of the actuating stops 34 or 43 on the driving gear wheel butts against the relevant prolonged actuating stop 35 or 44 on the drivable gear wheel, the relevant prolonged actuating stop is moved along in the same way as in the embodiment described with reference to FIGS. 1 to 4, causing the teeth 8 and 9 on the two gear wheels 3 and 5 to mesh automatically. As a result of the construction and arrangement of the stop surface of the actuating stops meshing proceeds in a particularly reliable and smooth manner in the same way as in the preceding embodiment. If the teeth again disengage when the driving gear wheel is driven further, the drivable gear wheel 5 has not yet reached its end position, but the relevant further limiting stop 53 or 54 on the driving gear wheel ensures that the drivable gear wheel 5 is moved to its end position and is subsequently retained in this position because it butts against the relevant prolonged actuating projection 35 or 44 to move this stop when the gear wheel 3 is driven. However, it is alternatively possible to use an over-centre spring which acts on the drivable gear wheel and, each time after the two gear wheels have disengaged, urges the drivable gear wheel with its counter-stop against one of the stationary limiting stops and retains it in this end position by its spring force. It is to be noted that in the present gear mechanism the drivable gear wheel is also partly toothed, but this is irrelevant to the operation of the present embodiment.

Such a gear mechanism is advantageous in, for example, a magnetic video-tape apparatus for a magnetic tape contained in a cassette. The tape can be extracted from the cassette and wrapped around a tape-guide drum by means of a threading device which is movable between a threaded-out position and a threaded-in position and which, when wrapped around the tape-guide drum, cooperates with a tape-tension sensor to move this tape-tension sensor. The tape tension sensors movable from an inactive position to an active position, in which case the driving gear wheel is constructed as a toothed threading ring which forms part of the threading device, and which can drive the partly toothed gear wheel to move the tape-tension sensor.

The gear mechanism shown in FIGS. 7 and 8 is a modification of the gear mechanism shown in FIGS. 1 to 4, this modification concerning the position of the actuating stops 34 and 35 relative to the first-meshing teeth 40 and 41 of the two toothed portions 8 and 9. As already explained for the gear mechanism shown in FIGS. 1 to 4, at least n teeth of the gear wheel 3 mesh with the toothed portion 9 of the gear wheel 5, n=2 in the present case. In the gear mechanism shown in FIGS. 7 and 8 each of the stop surfaces 36 and 37 of the actuating stops 34 and 35 respectively, is situated before the first-engaging tooth-flank surface 38 or 39 of the first-meshing tooth 40 or 41 of the respective gear wheels 3 and 5 when these are meshed with one another. Each of the stop surfaces 36 and 37 is situated at a distance along the relevant pitch circle from this tooth-flank surface 38 or 39, which corresponds to k times the circular pitch $T_o$, k being an integer between zero and n−1. In the present case k=1, which means that each stop surface 36 or 37 is situated at a distance corresponding to the pitch $T_o$ before the first-engaging tooth-flank surface 38 and 39 in the direction 19 or 24 in which the relevant gear wheel 3 or 5 is driven when these gear wheels are meshed with each other. When the gear wheels 3 and 5 are brought into mesh, this ensures that by their cooperating stop surfaces 36 and 37 the actuating stops 34 and 35 align the position of the toothed portions 8 and 9 earlier relative to each other than in the case of the gear mechanism shown in FIGS. 1 to 4. This again guarantees a smooth and correct meshing of the teeth when the tooth-flank surfaces 38 and 39 are first moved towards one another and cooperate with each other. The said distance between each of the stop surfaces 36 and 37 and the first-engaging tooth-flank surface 38 or 39 should not exceed (n−1) times the circular pitch $t_O$. If this distance is larger than (n−1) times the circular pitch it may happen that the stop surfaces of the actuating stops are already disengaged from each other before the teeth mesh with each other, so that the gear wheels will not be in mesh. In a gear mechanism in which the gear member which is necessarily toothed partly for example has at least three teeth which mesh with the teeth on the other gear member, the distance between each stop surface of an actuating stop and the first-engaging tooth-flank surface may be once or twice the circular pitch. It is to be noted that in the gear mechanism shown in FIG. 7 the drivable gear wheel is also partly toothed and the actuating stop on the drivable gear wheel is integral with the body and two teeth of this wheel.

What is claimed is:

1. A gear mechanism comprising a toothed driving gear rotatable in two opposite directions, a toothed drivable gear for meshing with said driving gear, at least one of said gears being only partly toothed, at least n teeth of the partly toothed gear being in mesh with the teeth of the other gear when the teeth of the gears are in mesh, n being an integer greater than zero, and a pair of actuating stop means, one on each gear each being offset from the surface of its associated gear in the axial direction, the operating surface of each stop means being of the same geometry as the engaging surface of the first tooth of its associated gear to be engaged by the cooperating gear upon meshing, each said stop means being located along the pitch circle of its associated gear at a distance from said engaging surface of the associated first tooth corresponding to k times the circular pitch, where k is an integer between zero and $n-1$, at least one of said stop means being extended beyond the addendum circle of its associated gear, said stop means on said drivable gear being in the path of movement of said stop means on said driving gear when said gears are out of mesh, said stop means on said driving gear in moving in the direction of said stop means on said drivable gear engaging said latter stop means and driving said drivable gear in a direction to have said gears mesh.

2. A gear mechanism as in claim 1, including a movement limiting stop and a cooperating counter-stop on said drivable gear whereby movement of said drivable gear in the direction which brings said gears out of mesh is limited.

3. A gear mechanism as in claim 2, including a spring which urges said counter-stop against said movement limiting stop when the gears are out of mesh.

4. A gear mechanism as in claim 2, including a further movement limiting stop and a cooperatig counter-stop on said driving gear whereby movement of said driving gear in the direction which brings said gears into mesh is limited.

5. A gear mechanism as in claim 2, including a second pair of actuating stops similar to said first pair of actuating stops but operable when said gears are moving in a direction which will take them out of mesh.

* * * * *